(12) United States Patent
Hayashi et al.

(10) Patent No.: US 11,669,417 B1
(45) Date of Patent: Jun. 6, 2023

(54) REDUNDANCY DETERMINATION SYSTEM AND REDUNDANCY DETERMINATION METHOD

(71) Applicant: Hitachi, Ltd., Tokyo (JP)

(72) Inventors: Shinichi Hayashi, Tokyo (JP); Kiyomi Wada, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/902,027

(22) Filed: Sep. 2, 2022

(30) Foreign Application Priority Data

Mar. 15, 2022 (JP) .............................. JP2022-040847

(51) Int. Cl.
G06F 11/00 (2006.01)
G06F 11/20 (2006.01)
G06F 9/50 (2006.01)
G06F 11/34 (2006.01)

(52) U.S. Cl.
CPC ........ *G06F 11/2025* (2013.01); *G06F 9/5077* (2013.01); *G06F 11/3419* (2013.01)

(58) Field of Classification Search
CPC .......................... G06F 11/2025; G06F 11/3419
See application file for complete search history.

(56) References Cited

U.S. PATENT DOCUMENTS

| | | | | |
|---|---|---|---|---|
| 7,120,769 B2 * | 10/2006 | Yagawa | ............... | G06F 11/2058 707/999.204 |
| 8,140,789 B2 * | 3/2012 | Nagata | ................ | G06F 11/1458 714/6.22 |
| 8,311,985 B2 * | 11/2012 | O'Keefe | ............. | G06F 11/1453 707/822 |
| 8,719,627 B2 * | 5/2014 | Watson | ................. | G06F 9/5088 714/13 |
| 9,454,433 B2 * | 9/2016 | Dennett | ............. | G06F 11/1092 |
| 10,884,885 B2 * | 1/2021 | Anders | ............... | G06F 11/2069 |
| 2012/0222041 A1 * | 8/2012 | Sabin | .................... | G06F 9/5083 718/105 |
| 2013/0339784 A1 * | 12/2013 | Bickelman | .......... | G06F 11/1092 714/6.11 |
| 2014/0298135 A1 * | 10/2014 | Dhuse | ................. | G06F 11/2094 714/763 |
| 2016/0048408 A1 * | 2/2016 | Madhu | .................. | H04L 47/783 718/1 |
| 2016/0246867 A1 * | 8/2016 | Bourbonnais | ....... | G06F 11/2097 |
| 2017/0060701 A1 * | 3/2017 | Dave | ................... | G06F 11/1471 |
| 2017/0249221 A1 * | 8/2017 | Jain | ...................... | G06F 11/2028 |
| 2019/0138287 A1 | 5/2019 | De Capoa et al. | | |
| 2020/0142788 A1 * | 5/2020 | Hu | ......................... | G06F 9/5077 |

* cited by examiner

*Primary Examiner* — Amine Riad
(74) *Attorney, Agent, or Firm* — Mattingly & Malur, PC

(57) ABSTRACT

Provided is a redundancy determination system extending a system on an on-premise data center to a public cloud by using a computer including a processor and a memory, in which the processor performs first processing of deploying the system in a plurality of of sites included in the public cloud when a recovery time objective of the system is less than a build-out time of the system that is calculated on the basis of an operational status of the system, and second processing of deploying the system in one site of the sites included in the public cloud when the recovery time objective of the system is not less than the build-out time.

10 Claims, 11 Drawing Sheets

FIG. 3

SDS VM INFORMATION 31

| PUBLIC CLOUD 311 | SITE 312 | INSTANCE TYPE 313 | SDS DEPLOYMENT TIME 314 | SDS ACTIVATION TIME 315 | SDS SUSPENSION TIME 316 |
|---|---|---|---|---|---|
| PUBLIC CLOUD A | SITE A | m5.large | 30 MINUTES | 10 MINUTES | 20 MINUTES |
| PUBLIC CLOUD A | SITE B | m5.xlarge | 36 MINUTES | 12 MINUTES | 24 MINUTES |
| PUBLIC CLOUD B | SITE C | D2 v5 | 30 MINUTES | 10 MINUTES | 20 MINUTES |
| ⋮ | ⋮ | ⋮ | ⋮ | ⋮ | ⋮ |

FIG. 4

DB VM INFORMATION 32

| PUBLIC CLOUD 321 | SITE 322 | INSTANCE TYPE 323 | DB DEPLOYMENT TIME 324 | DB DEPLOYMENT TIME 325 | DB SUSPENSION TIME 326 |
|---|---|---|---|---|---|
| PUBLIC CLOUD A | SITE A | m5.large | 5 MINUTES | 3 MINUTES | 5 MINUTES |
| PUBLIC CLOUD A | SITE B | m5.xlarge | 6 MINUTES | 4 MINUTES | 6 MINUTES |
| PUBLIC CLOUD B | SITE C | D2 v5 | 5 MINUTES | 3 MINUTES | 5 MINUTES |
| ⋮ | ⋮ | ⋮ | ⋮ | ⋮ | ⋮ |

FIG. 5

ROOT VOLUME SIZE INFORMATION 33

| USE APPLICATION 331 | ROOT VOLUME SIZE 332 |
|---|---|
| DB | 100 GB |
| STORAGE | 1 TB |
| : | : |

FIG. 6

CONNECTED LINE INFORMATION 34

| CONNECTION DESTINATION PUBLIC CLOUD 341 | CONNECTION DESTINATION SITE 342 | LINE BAND 343 | IN-USE BAND 344 |
|---|---|---|---|
| PUBLIC CLOUD A | SITE A | 10 Gbps | 1.2 Gbps |
| PUBLIC CLOUD A | SITE B | 1 Gbps | 0.2 Gbps |
| : | : | : | : |

FIG. 7

VM FEE INFORMATION 35

| PUBLIC CLOUD 351 | SITE 352 | INSTANCE TYPE 353 | FEE 354 |
|---|---|---|---|
| PUBLIC CLOUD A | SITE A | m5.large | 0.10 $/HOUR |
| PUBLIC CLOUD A | SITE B | m5.xlarge | 0.20 $/HOUR |
| PUBLIC CLOUD B | SITE C | D2 v5 | 0.11 $/HOUR |
| : | : | : | : |

FIG. 8

CAPACITY FEE INFORMATION 36

| PUBLIC CLOUD 361 | SITE 362 | VOLUME TYPE 363 | FEE 364 |
|---|---|---|---|
| PUBLIC CLOUD A | SITE A | gp3 | 0.10 $/GB/MONTH |
| PUBLIC CLOUD A | SITE B | | |
| PUBLIC CLOUD B | SITE C | | |
| : | : | : | : |

FIG. 9

DB INFORMATION 37

| DB 371 | RTO 372 | QUERY TARGET EXECUTION TIME 373 | STATIONARY QUERY MULTIPLICITY 374 | MAXIMUM QUERY MULTIPLICITY 375 | CAPACITY 376 | CPU USAGE RATE THRESHOLD VALUE 377 | OPERATION RATE THRESHOLD VALUE 378 | NW USAGE RATE THRESHOLD VALUE 379 |
|---|---|---|---|---|---|---|---|---|
| DB A | 60 MINUTES | 3 MINUTES | 2 | 20 | 6.0 TB | 90% | 0.8 | 90% |
| DB B | 12 HOURS | 15 MINUTES | 2 | 10 | 2.3 TB | 95% | 0.7 | 95% |
| : | : | : | : | : | : | : | : | : |

FIG. 10

DB VM NUMBER INFORMATION 38

| DB 381 | PUBLIC CLOUD 382 | DB VM INSTANCE TYPE 383 | STATIONARY DB VM NUMBER 384 | MAXIMUM DB VM NUMBER 385 | SDS VM INSTANCE TYPE 386 | MAXIMUM SDS VM NUMBER 387 |
|---|---|---|---|---|---|---|
| DB A | PUBLIC CLOUD A | m5.large | 2 | 20 | m5.large | 10 |
| DB A | PUBLIC CLOUD B | D2 v5 | 2 | 20 | D2 v5 | 10 |
| : | : | : | : | : | : | : |

FIG. 11

DB OPERATION INFORMATION 39

| DB 391 | QUERY ARRIVAL NUMBER 392 | QUERY EXECUTION NUMBER 393 | QUERY EXECUTION TIME 394 | CPU USAGE RATE 395 | NW USAGE RATE 396 |
|---|---|---|---|---|---|
| DB A | 8.0 QUERIES/MINUTE | 6.5 QUERIES/MINUTE | 63 SECONDS | 100% | 35% |
| DB B | 1.0 QUERIES/MINUTE | 1.0 QUERIES/MINUTE | 30 SECONDS | 50% | 20% |
| : | : | : | : | : | : |

FIG. 12

SUBSITE ADVANCE PREPARATION INFORMATION 40

| ITEM 501 | | TIME [MINUTE] 502 | PREPARATION PATTERN 503 | | | | | |
|---|---|---|---|---|---|---|---|---|
| | | | PREPARATION 1 | PREPARATION 2 | PREPARATION 3 | PREPARATION 4 | PREPARATION 5 | PREPARATION 6 |
| PROCESSING 504 | SDS DEPLOYMENT | 30 | ADVANCE | ADVANCE | ADVANCE | ADVANCE | ADVANCE | 30 |
| | DATA COPY | 91 | ADVANCE | ADVANCE | ADVANCE | ADVANCE | ADVANCE | 91 |
| | SDS SUSPENSION | — | | | | | ADVANCE | |
| | SDS ACTIVATION | 10 | | | | | 10 | |
| | DB DEPLOYMENT | 5 | ADVANCE | ADVANCE | ADVANCE | 5 | 5 | 5 |
| | DB SUSPENSION | — | | ADVANCE | ADVANCE | | | |
| | SDS SUSPENSION | — | | | ADVANCE | | | |
| | SDS ACTIVATION | 10 | | | 10 | | | |
| | DB ACTIVATION | 3 | | 3 | 3 | | | |
| RECOVERY TIME 505 | | — | 0 | 3 | 13 | 5 | 15 | 126 |
| SDS PREPARATION STATE 506 | | — | ACTIVATION | ACTIVATION | SUSPENSION | ACTIVATION | SUSPENSION | NOT YET |
| DB PREPARATION STATE 507 | | — | ACTIVATION | SUSPENSION | SUSPENSION | NOT YET | NOT YET | NOT YET |
| PREPARATION COST [$/MONTH] 508 | | — | 3960 | 2520 | 1800 | 2320 | 1600 | 0 |

FIG. 13

SUBSITE ADVANCE PREPARATION COST INFORMATION 41

| | PREPARATION PATTERN 511 | | | | | |
|---|---|---|---|---|---|---|
| | PREPARATION 1 | PREPARATION 2 | PREPARATION 4 | PREPARATION 3 | PREPARATION 5 | PREPARATION 6 |
| RECOVERY TIME 512 | 0 | 3 | 5 | 13 | 15 | 108 |
| PREPARATION COST [$/MONTH] 513 | 3960 | 2520 | 2320 | 1800 | 1600 | 0 |

FIG. 14

SUBSITE REDUNDANCY CONFIRMATION SCREEN 42

| DB 521 | RTO 522 | ESTIMATED RECOVERY TIME 523 | PREPARATION COST [$/MONTH] 524 | ORIGINAL SITE 525 | SUBSITE 526 |
|---|---|---|---|---|---|
| DB A | 10 MINUTES | 5 MINUTES | 2,320 $/MONTH | PUBLIC CLOUD A SITE A | PUBLIC CLOUD A SITE B |
| DB B | 300 MINUTES | 108 MINUTES | 0 $/MONTH | PUBLIC CLOUD A SITE A | PUBLIC CLOUD A SITE B |
| DB C | 0 MINUTES | 0 MINUTES | 3,960 $/MONTH | PUBLIC CLOUD A SITE A, PUBLIC CLOUD A SITE B | NONE |

REDUNDANCY DETERMINATION SYSTEM AND REDUNDANCY DETERMINATION METHOD

CROSS-REFERENCE TO RELATED APPLICATION

The present application claims priority from Japanese application JP 2022-040847, filed on Mar. 15, 2022, the contents of which is hereby incorporated by reference into this application.

BACKGROUND OF THE INVENTION

1. Field of the Invention

The present invention relates to a technology for determining redundancy of a system in cloud bursting.

2. Description of the Related Art

In a case of an extensive IT environment, it may be less expensive to operate a system that is continuously operated for a long period of time in an on-premise data center than in a public cloud, and it may be less expensive to operate a system that is temporarily operated in a public cloud. In data analysis processing with a large load change, there is a possibility that the cost can be reduced by cloud bursting in which a stationary load is processed in the on-premise data center, and a temporarily increasing load is processed in the cloud. The public cloud includes a plurality of sites such that the processing can be continued even in a case where a failure occurs. Accordingly, in the cloud bursting, it is necessary to deploy the system to the plurality of sites, on the basis of the requisites of the system. In order to solve such a problem, for example, a technology disclosed in US 2019/0138287 is known. In the technology disclosed in US 2019/0138287, a system is deployed to a plurality of sites.

In US 2019/0138287, since the system is deployed to the plurality of sites regardless of whether or not it is necessary to deploy the system to the plurality of sites, an unnecessary cost may increase. Accordingly, there is a problem of determining whether or not it is necessary to deploy the system to the plurality of sites.

SUMMARY OF THE INVENTION

An object of the invention is to provide a technology that is capable of performing cloud bursting without increasing an unnecessary cost.

A redundancy determination system according to the invention is configured as a redundancy determination system extending a system on an on-premise data center to a public cloud by using a computer including a processor and a memory, in which the processor performs first processing of deploying the system in a plurality of sites included in the public cloud when a recovery time objective of the system is less than a build-out time of the system that is calculated on the basis of an operational status of the system, and second processing of deploying the system to one site of the sites included in the public cloud when the recovery time objective of the system is not less than the build-out time.

According to the invention, cloud bursting can be performed without increasing an unnecessary cost.

BRIEF DESCRIPTION OF THE DRAWINGS

FIG. 3 illustrates an example of SDS VM information;

FIG. 4 illustrates an example of DB VM information;

FIG. 5 illustrates an example of root volume size information;

FIG. 6 illustrates an example of connected line information;

FIG. 7 illustrates an example of VM fee information;

FIG. 8 illustrates an example of capacity fee information;

FIG. 9 illustrates an example of DB information;

FIG. 10 illustrates an example of VM number information;

FIG. 11 illustrates an example of DB operation information;

FIG. 12 illustrates an example of subsite advance preparation information;

FIG. 13 illustrates an example of subsite advance preparation cost information;

FIG. 14 illustrates an example of a redundancy confirmation screen;

DETAILED DESCRIPTION OF THE PREFERRED EMBODIMENTS

Example 1

Figure 1:
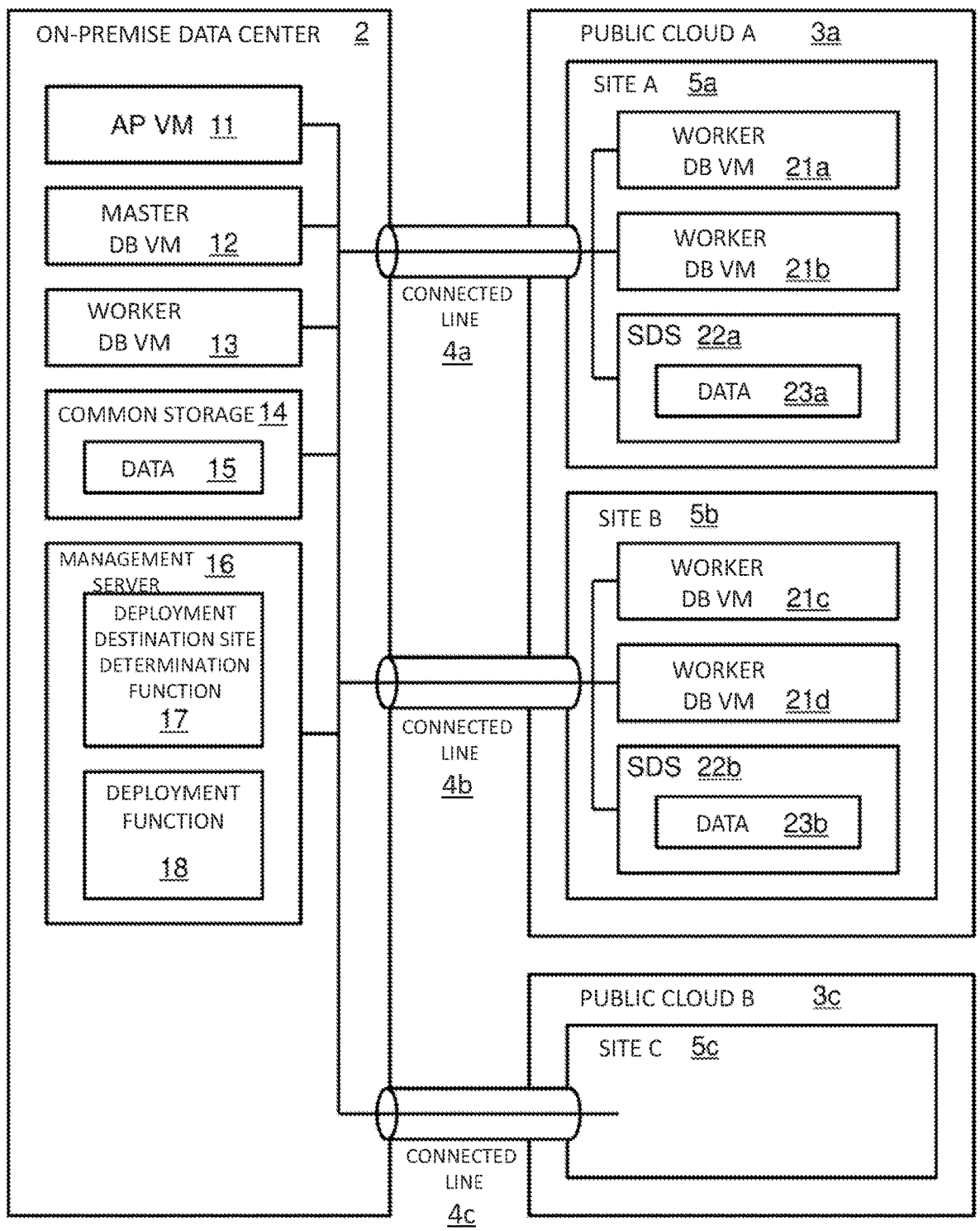
FIG. 1 illustrates an example of a system configuration according to Example 1.

An embodiment will be described with reference to the drawings. The following description and the drawings are an example for describing the invention, and will be suitably omitted and simplified for the clarification of the description. The invention can be implemented in various forms. Unless otherwise specified, each constituent may be singular or plural.

The position, the size, the shape, the range, and the like of each constituent illustrated in the drawings may not represent the actual position, size, shape, range, and the like in order to facilitate the understanding of the invention. Accordingly, the invention is not necessarily limited to the position, the size, the shape, the range, and the like disclosed in the drawings.

In the following description, various information pieces may be described by expressions such as "database", "table", and "list", but various information pieces may be expressed by data structures other than the above. "XX table", "XX list", and the like may be referred to as "XX information" in order to indicate that "XX table", "XX list", and the like do not depend on the data structure. In a case where expressions such as "identification information", "identifier", "name", "ID", and "number" are used when describing the identification information, "identification information", "identifier", "name", "ID", "number", and the like can be replaced with each other.

When there are a plurality of constituents having the same or similar functions, the constituents may be described by adding different subscripts to the same reference numerals. Here, in a case where it is not necessary to distinguish the plurality of constituents from each other, the description will be made by omitting the subscripts.

In addition, in the following description, processing that is performed by executing a program may be described, but the program is executed by a processor (for example, a central processing unit (CPU), and a graphics processing unit (GPU)), and since set processing is suitably performed while using a storage resource (for example, a memory) and/or an interface device (for example, a communication port), a subject of the processing may be the processor. Similarly, the subject of the processing that is performed by executing the program may be a controller, a device, a system, a computer, and a node including the processor. The subject of the processing that is performed by executing the program may be an arithmetic unit, and may include a dedicated circuit (for example, a field-programmable gate array (FPGA) or an application specific integrated circuit (ASIC)) performing specific processing.

The program may be installed in a device such as a computer from a program source. The program source, for example, may be a storage medium that can be read by a program distribution server or a computer. In a case where the program source is the program distribution server, the program distribution server may include a processor and a storage resource for storing a program that is a distribution target, and the processor of the program distribution server may distribute the program that is the distribution target to other computers. In addition, in the following description, two or more programs may be attained as one program, or one program may be attained as two or more programs.

Figure 17:
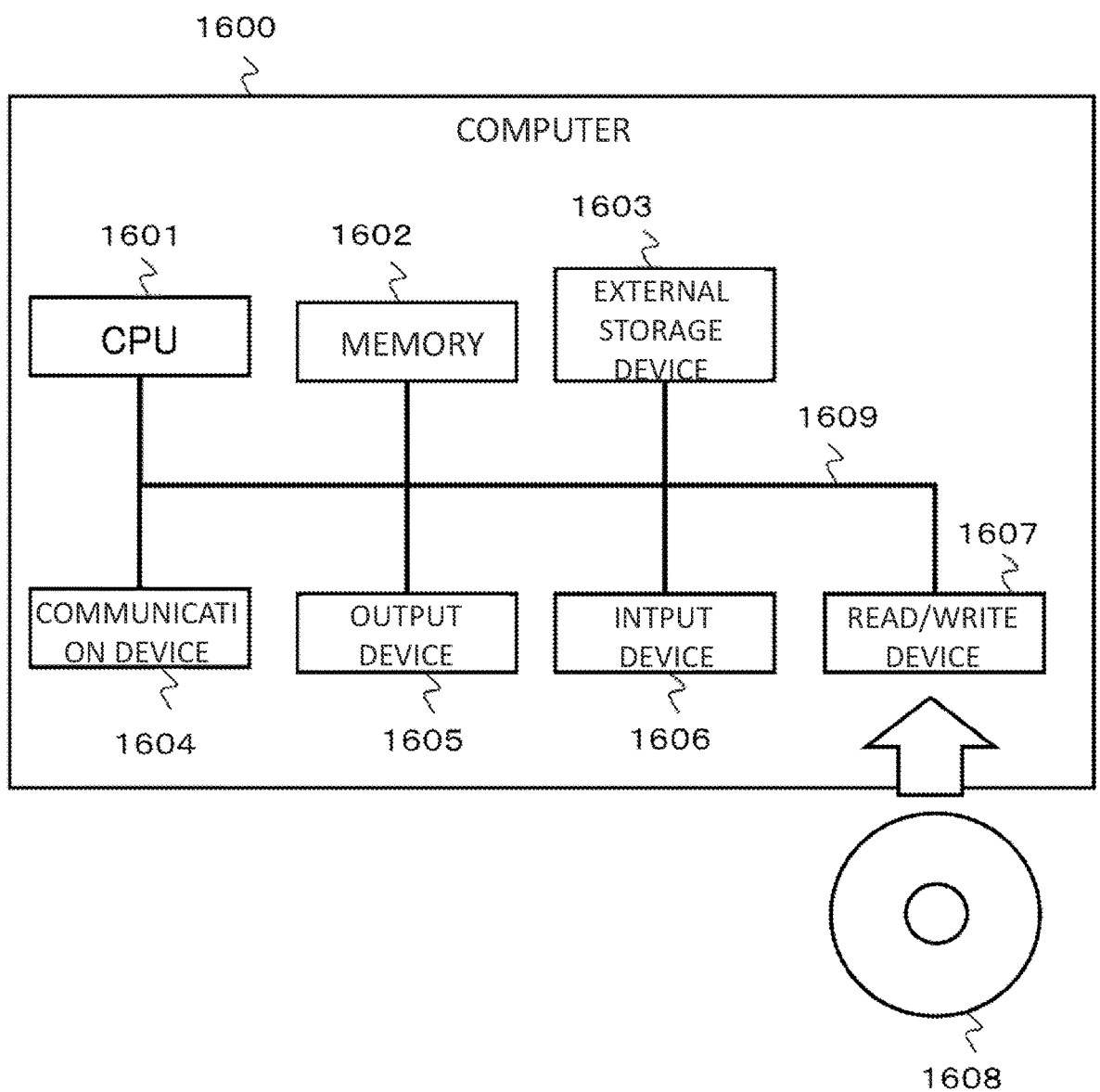
FIG. 17 illustrates an example of a computer schematic view.

Specifically, even though it will be described below by using FIG. 5, terminals or servers used in this system, for example, as illustrated in FIG. 17 (a schematic view of a computer), can be attained by a general computer 1600 including a CPU 1601, a memory 1602, an external storage device 1603 such as a hard disk drive (HDD), a read/write device 1607 reading and writing information with respect to a portable storage medium 1608 such as a compact disk (CD) or a USB memory, an input device 1606 such as a keyboard or a mouse, an output device 1605 such as a display, a communication device 1604 such as a network interface card (NIC) for connection to a communication network, and an internal communication line (referred to as a system bus) 1609 such as a system bus for connecting the above.

In addition, various data pieces that are stored in each of the terminals or the servers or used in the processing can be attained by the CPU 1601 reading out and using the data from the memory 1602 or the external storage device 1603. In addition, each of function units included in each of the terminals or the servers (for example, a deployment destination site determination function 17 and a deployment function 18 of a management server 16) can be attained by the CPU 1601 loading and executing a predetermined program that is stored in the external storage device 1603 into the memory 1602.

The predetermined program described above may be stored (downloaded) in the external storage device 1603 from the storage medium 1608 through the read/write device 1607 or from a network through the communication device 1604, and then, may be loaded on the memory 1602, and may be executed by the CPU 1601. In addition, the predetermined program may be directly loaded on the memory 1602 from the storage medium 1608 through the read/write device 1607 or from the network through the communication device 1604, and may be executed by the CPU 1601.

Hereinafter, a case will be exemplified in which this system includes one computer, but all or a part of the functions are distributed to one or a plurality of computers such as a cloud and communicate with each other through a network, and thus, the same function may be attained. In addition, even though it will be described below in detail, for example, in a case where a recovery time objective (RTO) of a system of an on-premise data center is less than a build-out time of a portion that extends the system of the on-premise data center to a public cloud, the system is deployed to two or more sites, otherwise, the system is deployed to one site.

FIG. 1 illustrates an example of a system configuration. A system 1 includes an on-premise data center 2, a public cloud A 3a, a public cloud B 3b, a connected line 4a, a connected line 4b, and a connected line 4c. The on-premise data center is a data center of a company that owns an IT system. The on-premise data center may be a data center of a business operator of a data center that provides a collocation service. The public cloud is a cloud that is used by an unspecified number of companies or organizations. The public cloud A 3a includes a site A 5a and a site B 5b. The public cloud B 3c includes a site C 5c. The site is a data center for executing a service that is provided in the public cloud. The public cloud includes a plurality of sites. Accordingly, even in a case where one site is damaged, and the service is not capable of being provided, the service can be provided in the other site. The connected line 4a is a line for connecting the on-premise data center 2 and the site A 5a. The connected line 4b is a line for connecting the on-premise data center 2 and the site B 5b. The connected line 4c is a line for connecting the on-premise data center 2 and the site C 5c.

The on-premise data center 2 includes an AP virtual machine (VM) 11, a master DB VM 12, a worker DB VM 13, a common storage 14, and a management server 16. The AP VM 11 is a VM executing a business application, and reads in required data from the master DB VM 12. The master DB VM 12 is a VM that reads and writes data in the common storage 14 in response to a request from the AP VM 11, and returns the result thereof to the AP VM 11. The master DB VM 12 requests the worker DB VM 13 or a worker DB VM that is operated on the public cloud to perform processing, in accordance with the situation of a load. The worker DB VM 13 is a VM that reads and writes data in the common storage 14 in response to a request from the master DB VM 12, and returns the result thereof to the master DB VM 12. The common storage 14 includes data 15. The common storage 14 reads out and writes in the data 15 in response to a request from the master DB VM 12 and the worker DB VM 13, and returns the result thereof to the master DB VM 12 and the worker DB VM 13. The management server 16 includes the deployment destination site determination function 17 and the deployment function 18. The deployment destination site determination function 17 is a function of determining which site to use, which VM to deploy, or which data to prepare in a case where it is expected that the request from the AP VM 11 is not capable of being processed within a processing time set by a user of the system only with the master DB VM 12 and the worker DB VM 13. The deployment function 18 is a function of building out the system having a configuration determined by the deployment destination site determination function 17.

The site A 5a includes a worker DB VM 21a, a worker DB VM 21b, and a software-defined storage (SDS) 22a. The worker DB VM 21a is a VM that reads and writes data in the SDS 22a in response to a request from the master DB VM 12, and returns the result thereof to the master DB VM 12. The worker DB VM 21b is identical to the worker DB VM 21a. The SDS 22a includes data 23a. The SDS 22a reads out and writes in the data 23a in response to a request from the worker DB VM 21a, and returns the result thereof to the worker DB VM 21a. The site B 5b and the site C 5c are identical to the site A 5a, and include the worker DB VM and the SDS.

Figure 2:
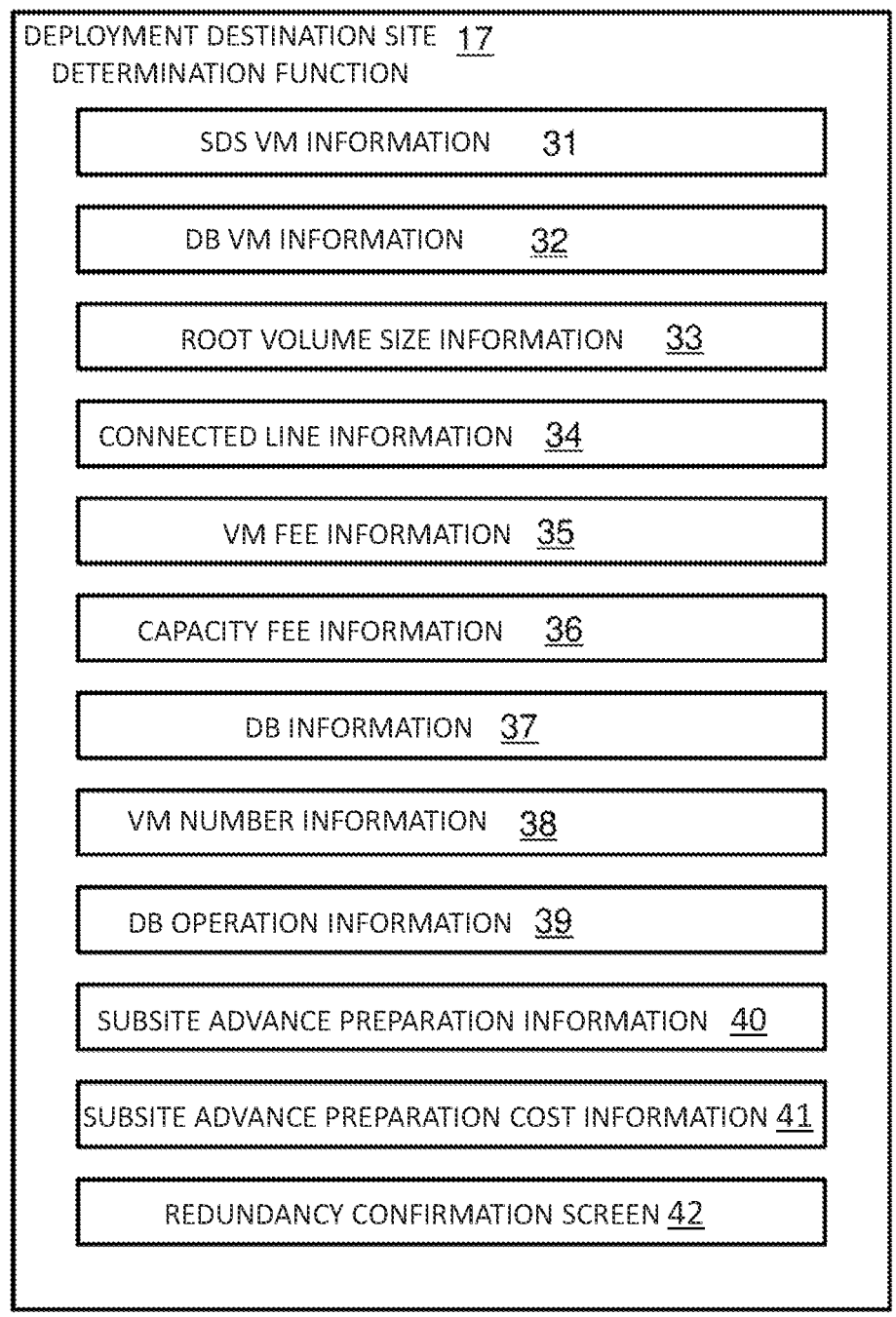
FIG. 2 illustrates an example of information included in a deployment destination site determination function.

FIG. 2 illustrates an example of information included in the deployment destination site determination function 17. The deployment destination site determination function 17 includes SDS VM information 31, DB VM information 32, root volume size information 33, connected line information 34, VM fee information 35, capacity fee information 36, DB information 37, VM number information 38, DB operation information 39, subsite advance preparation information 40, subsite advance preparation cost information 41, and a redundancy confirmation screen 42.

FIG. 3 is an example of the SDS VM information 31. The SDS VM information indicates a deployment time, an activation time, and a suspension time of the SDS VM for each public cloud, each site, and each instance type. The SDS VM information 31 includes a public cloud 311, a site 312, an instance type 313, an SDS deployment time 314, an SDS activation time 315, and an SDS suspension time 316.

The public cloud 311 indicates a public cloud to which the SDS is deployed. The site 312 indicates a site to which the SDS is deployed. The instance type 313 indicates an instance type configuring the SDS. The SDS deployment time 314 indicates a time required for deploying the SDS. The SDS activation time 315 indicates a time required for activating SDS. The SDS suspension time 316 indicates a time required for suspending the SDS.

FIG. 4 illustrates an example of the DM VM information 32. The DB VM information indicates a deployment time, an activation time, and a suspension time of the DB VM for each public cloud, each site, and each instance type. The DB VM information 32 includes a public cloud 321, a site 322, an instance type 323, a DB deployment time 324, a DB activation time 325, and a DB suspension time 326.

The public cloud 321 indicates a public cloud to which the DB VM is deployed. The site 322 indicates a site to which the DB VM is deployed. The instance type 323 indicates an instance type configuring the DB VM. The DB deployment time 324 indicates a time required for deploying the DB VM. The DB activation time 325 indicates a time required for activating the DB VM. The DB suspension time 326 indicates a time required for suspending the DB VM.

FIG. 5 illustrates an example of the root volume size information 33. The root volume size information 33 indicates a required size of a root volume of the VM for each use application such as an application for the DB and an application for the SDS. The root volume size information 33 includes a use application 331 and a root volume size 332.

The use application 331 indicates a use application of the VM. The root volume size 332 indicates the required size of the root volume of the VM.

FIG. 6 illustrates an example of the connected line information 34. The connected line information 34 indicates a band of a line for connecting the on-premise data center and the site of the public cloud, and an in-use band at a data acquisition time point. The connected line information 34 includes a connection destination public cloud 341, a connection destination site 342, a line band 343, and an in-use band 344.

The connection destination public cloud 341 indicates a public cloud to which the line is connected. The connection destination site 342 indicates a site to which the line is connected. The line band 343 indicates an upper limit value of the band that can be used in the line. The in-use band 344 indicates the in-use band at the data acquisition time point.

FIG. 7 illustrates an example of the VM fee information 35. The VM fee information 35 indicates a usage fee per unit time of the VM for each public cloud, each site, and each instance type. The VM fee information 35 includes a public cloud 351, a site 352, an instance type 353, and a fee 354.

The public cloud 351 indicates a public cloud to which the VM is deployed. The site 352 indicates a site to which the VM is deployed. The instance type 353 indicates an instance type to be deployed. The fee 354 indicates a usage fee per unit time of the VM to be deployed.

FIG. 8 illustrates an example of the capacity fee information 36. The capacity fee information 36 indicates the capacity of a volume and a usage fee per unit time for each public cloud, each site, and each volume type. The capacity fee information 36 is referred to, in order to calculate a fee for the root volume of the VM and a capacity for storing the data of the SDS. The capacity fee information 36 includes a public cloud 361, a site 362, a volume type 363, and a fee 364.

The public cloud 361 indicates a public cloud to which the VM is deployed. The site 362 indicates a site to which the VM is deployed. The volume type 363 indicates a volume type of the volume for storing the data. The fee 364 indicates the capacity of the volume and the usage fee per unit time.

FIG. 9 illustrates an example of the DB information 37. The DB information 37 indicates the requisites of the DB that are set by the user of the system, and the capacity of the DB at the data acquisition time point. The DB information 37 includes a DB 371, an RTO 372, a query target execution time 373, a stationary query multiplicity 374, a maximum query multiplicity 375, a capacity 376, a CPU usage rate threshold value 377, an operation rate threshold value 378, and an NW usage rate threshold value 379.

The DB 371 indicates the DB. The RTO 372 indicates the RTO of the DB. The RTO is a time until the query can be processed within the query target execution time after a failure occurs. The query target execution time 373 indicates a target value of a time required for executing the query. The stationary query multiplicity 374 indicates the number of queries to be executed stationarily and simultaneously. The maximum query multiplicity 375 indicates a maximum value of the queries to be simultaneously executed in a case where a load is increased. The capacity 376 indicates the capacity of the DB at the data acquisition time point. The CPU usage rate threshold value 377 indicates a threshold value of a CPU usage rate of the DB VM. The operation rate threshold value 378 indicates a threshold value of an operation rate of the DB VM. The NW usage rate threshold value 379 indicates a threshold value of an NW usage rate of the DB VM.

FIG. 10 illustrates an example of the VM number information 38. The VM number information 38 indicates a stationary DB VM number, a maximum DB VM number, a stationary SDS VM number, and a maximum SDS VM number for each DB and each instance type, respectively. The VM number information 38 includes a DB 381, a public cloud 382, a DB VM instance type 383, a stationary DB VM number 384, a maximum DB VM number 385, an SDS VM instance type 386, and a maximum SDS VM number 387.

The DB 381 indicates the DB. The public cloud 382 indicates a public cloud in which the VM is operated. The DB VM instance type 383 indicates an instance type of the DB VM. The DB stationary DB VM number 384 is a VM number of the DB that is stationarily required, and indicates a VM number of the DB that is stationarily operated in the on-premise data center. The maximum DB VM number 385 is a VM number of the DB that is maximally required, and indicates a number obtained by adding the DB VM that is operated in the public cloud when performing cloud bursting to the DB VM that is stationarily operated in the on-premise data center. The SDS VM instance type 386 indicates an instance type of the SDS VM. The maximum SDS VM number 387 is a VM number of the SDS that is maximally required, and indicates an SDS VM number of the SDS that is operated in the public cloud when performing the cloud bursting.

FIG. 11 illustrates an example of the DB operation information 39. The DB operation information 39 includes a DB 391, a query arrival number 392, a query execution number 393, a query execution time 394, a CPU usage rate 395, and an NW usage rate 396.

The DB 391 indicates the DB. The query arrival number 392 indicates the number of queries arriving at the DB per unit time. The query execution number 393 indicates the number of queries executed by the DB per unit time. The query execution time 394 indicates an average value of a time required for executing the queries executed per unit time. The CPU usage rate 395 indicates an average value of the CPU usage rate of the DB VM, and the NW usage rate 396 indicates an average value of the NW usage rate of the DB VM.

FIG. 12 illustrates an example of the subsite advance preparation information 40. The subsite advance preparation information 40 indicates advance preparation required in a subsite when using the plurality of sites (for example, when using two sites, one of the sites), and recovery processing when a failure occurs in the site. The subsite advance preparation information 40 includes an item 501, a time 502, and a preparation pattern 503. The subsite advance preparation information 40 is preparation information for using one site in a case where the cloud bursting is performed in the plurality of sites included in the public cloud.

The item 501 indicates an item in the subsite advance preparation information 40. The item 501 includes processing 504, a recovery time 505, an SDS preparation state 506, a DB preparation state 507, and a preparation cost 508.

The processing 504 indicates processing required for the advance preparation. In the item 501, the SDS deployment indicates the deployment of the SDS to the site. Data copy indicates the copy of the data in the common storage in the on-premise data center to the SDS in the site. Since a processing speed of the data copy is different in accordance with a communication situation, the time 502 described below is calculated at a timing of performing the cloud bursting. The SDS suspension indicates that the SDS VM is suspended, and the SDS VM is activated after a failure occurs in the site. Accordingly, it is possible to prevent the usage fee of the SDS VM, but it takes time until the query execution is started after a failure occurs in the site. The DB deployment indicates the deployment of the DB to the site. The DB suspension indicates that the DB VM is suspended, and the DB VM is activated after a failure occurs in the site. Accordingly, it is possible to prevent the usage fee of the DB VM, but it takes time until the query execution is started after a failure occurs in the site.

The time 502 indicates a time required for the processing of the processing 504. The preparation pattern 503 indicates whether to perform in advance the processing of the processing 504 or to perform the processing after a failure occurs in the site. In a case of performing the processing after a failure occurs in the site, the time indicates a time required for the processing.

The recovery time 505 indicates a sum of the processing time after a failure occurs in the site. The SDS preparation state 506 indicates the state of the SDS after the advance preparation. In the advance preparation, a case where the SDS is deployed and the SDS VM is not suspended is set to "Activation". A case where the SDS is deployed and the SDS VM is suspended is set to "Suspension". A case where the SDS is not deployed is set to "Not yet". The DB preparation state 507 indicates the state of the DB after the advance preparation. In the advance preparation, a case where the DB is deployed and the DB VM is not suspended is set to "Activation". A case where the DB is deployed and the DB VM is suspended is set to "Suspension". A case where the DB is not deployed is set to "Not yet". The preparation cost 508 indicates a monthly cost of the SDS VM and the DB VM required by the advance preparation. In a case where the VM is activated, the preparation cost 508 is a cost required in a case of using a volume for storing the data.

FIG. 13 illustrates an example of the subsite advance preparation cost information 41. The subsite advance preparation cost information 41 indicates a cost required in a case of the advance preparation of the subsite. The subsite advance preparation cost information 41 includes a preparation pattern 511, a recovery time 512, and a preparation cost 513.

The preparation pattern 511 indicates advance preparation indicating the preparation pattern 503. The recovery time 512 indicates a time required for recovery. The preparation cost 513 indicates a cost required for the advance preparation. In FIG. 13, it is found that the preparation patterns are rearranged in ascending order of the recovery time and in descending order of the preparation cost.

FIG. 14 illustrates an example of the redundancy confirmation screen 42. The redundancy confirmation screen 42 is a screen for the user of the system to confirm the redundancy. The redundancy confirmation screen 42 indicates a DB 521, an RTO 522, an estimated recovery time 523, a preparation cost 524, an original site 525, and a subsite 526.

The DB 521 indicates the DB. The RTO 522 indicates the RTO of the DB that is input by the user of the system. The estimated recovery time 523 indicates a time required for the recovery estimated by using the subsite advance preparation information 40. The preparation cost 524 is estimated by using the subsite advance preparation information 40. The original site 525 indicates a site in which the DB is executed when performing the cloud bursting. In a case where the DB is executed in the plurality of sites, the original site 525 indicates the plurality of sites. The subsite 526 indicates a site in which the DB is executed in a case where a failure occurs in the site when performing the cloud bursting.

Figure 15:
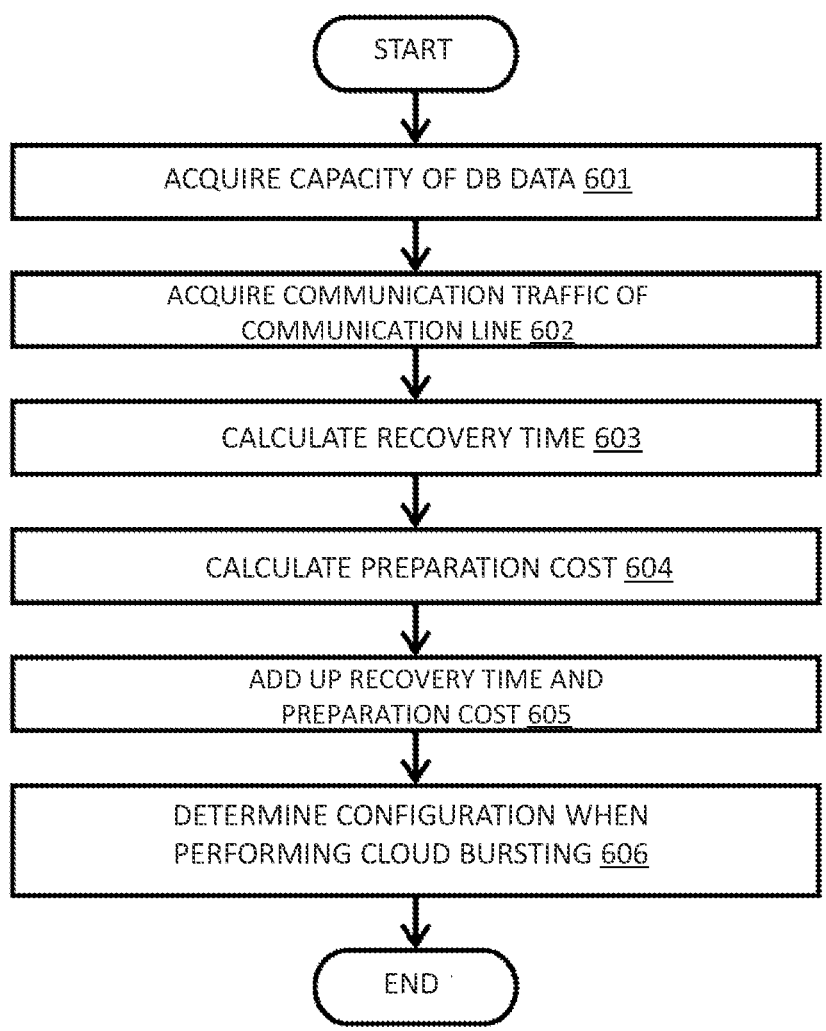
FIG. 15 illustrates an example of a flow of determining advance preparation content on the basis of an RTO.

FIG. 15 illustrates an example of a flow of determining advance preparation content on the basis of the RTO. The deployment destination site determination function 17 is executed regularly or when performing the cloud bursting.

In step 601, the deployment destination site determination function 17 acquires the capacity of the DB from the master DB VM 12, and updates the capacity 376 of the DB information 37.

In step 602, the deployment destination site determination function 17 acquires the in-use band of the connected line from the site, and updates the in-use band 344 of the connected line information 34.

In step 603, the deployment destination site determination function 17 acquires the instance type of the DB VM from the DB VM instance type 383 of the DB VM number information 38. The deployment destination site determination function 17 acquires the instance type of the SDS VM from the SDS VM instance type 386 of the DB VM number information 38. The deployment destination site determination function 17 acquires the SDS deployment time from the SDS deployment time 314 of the SDS VM information 31, and updates the time 502 of the subsite advance preparation information 40. The deployment destination site determination function 17 acquires the SDS activation time from the SDS activation time 315 of the SDS VM information 31, and updates the time 502 of the subsite advance preparation information 40. The deployment destination site determination function 17 acquires the DB deployment time from the DB deployment time 324 of the DB VM information 32, and updates the time 502 of the subsite advance preparation information 40. The deployment destination site determination function 17 acquires the DB activation time from the DB activation time 325 of the DB VM information 32, and updates the time 502 of the subsite advance preparation information 40. The deployment destination site determination function 17 updates the preparation pattern 503, and updates the recovery time 505, on the basis of the time 502 of the subsite advance preparation information 40.

In step 604, the deployment destination site determination function 17 calculates the usage fee, and updates the preparation cost 508, on the basis of the SDS preparation state 506 of the subsite advance preparation information 40, the DB preparation state 507, the VM fee information 35, the capacity fee information 36, and the DB VM number information 38. The SDS VM number is the maximum SDS VM number 387 of the DB VM number information 38. In a case where the SDS preparation state 506 is "Activation", a monthly usage fee of the SDS is calculated on the basis of the VM fee information 35 and the capacity fee information 36. In a case where the SDS preparation state 506 is "Suspension", the monthly usage fee of the SDS is calculated on the basis of the capacity fee information 36. In a case where the SDS preparation state 506 is "Not yet", the monthly usage fee of SDS is 0. The DB VM number is a difference between the maximum DB VM number 385 and the stationary DB VM number 384 of the DB VM number information 38. In a case where the DB preparation state 507 is "Activation", the monthly rate is calculated on the basis of the VM fee information 35 and the capacity fee information 36. In a case where the DB preparation state 507 is "Suspension", the monthly rate is calculated on the basis of the capacity fee information 36. In a case where the DB preparation state 507 is "Not yet", the preparation cost is 0.

In step 605, the deployment destination site determination function 17 creates the subsite advance cost information 41 on the basis of the subsite advance preparation information 40, and rearranges columns in ascending order of the recovery time 512. The columns are compared to each other, and in a case where is a column in which the recovery time 512 is longer than a predetermined time and the preparation cost 513 is higher than a predetermined price, the column is deleted.

In step 606, the deployment destination site determination function 17 selects a preparation pattern in which the recovery time 512 of the subsite advance cost information 41 is less than or equal to the RTO 372 of the DB information 37, as a configuration when performing the cloud bursting.

Figure 16:
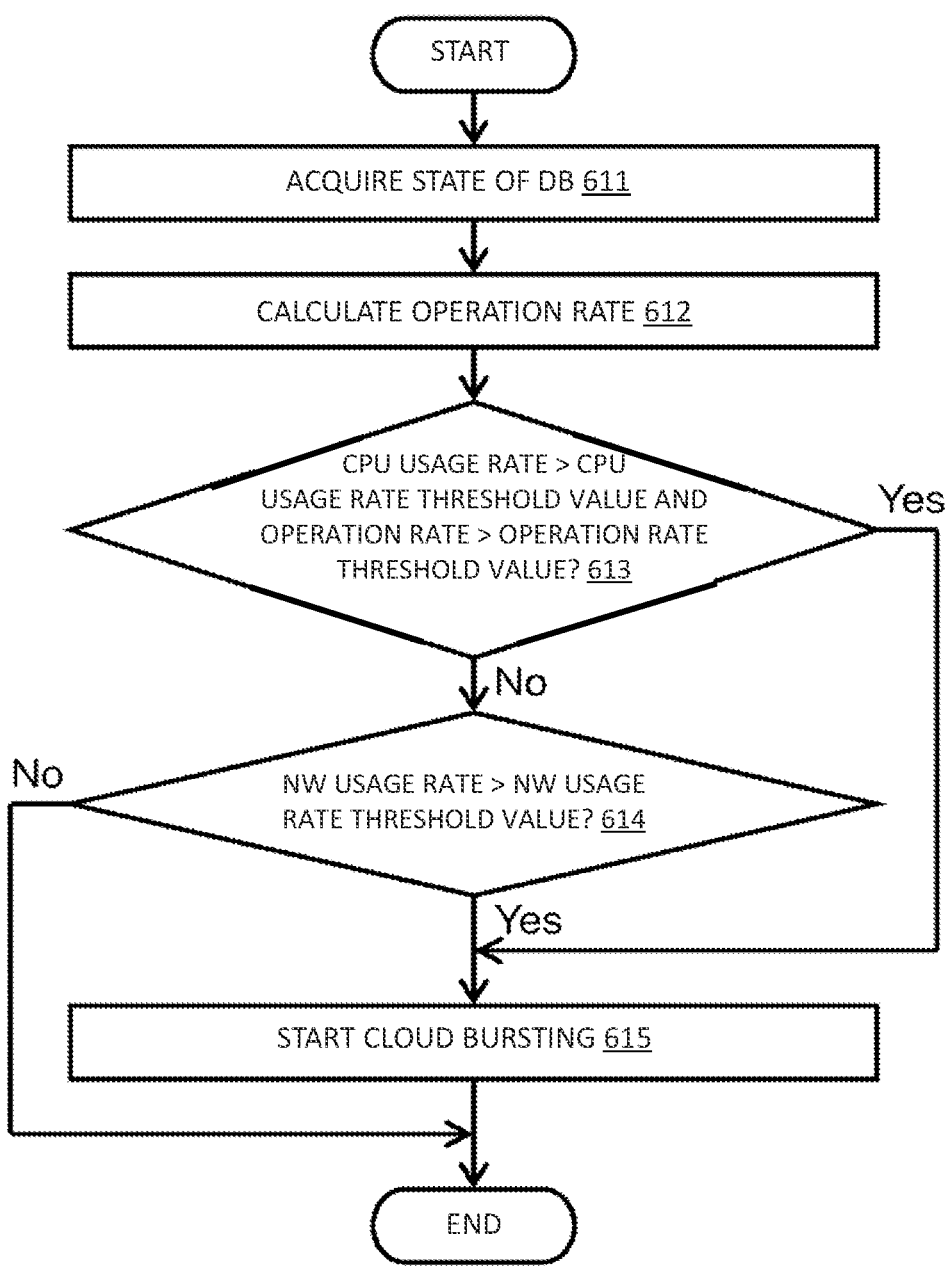
FIG. 16 illustrates an example of a flow of determining whether or not to perform cloud bursting.

FIG. 16 illustrates an example of a flow of determining whether or not to perform the cloud bursting. The deployment destination site determination function 17 is regularly executed at a frequency such as every minute.

In step 611, the deployment destination site determination function 17 acquires information from the master DB VM 12, the worker DB VM 13, and the worker DB VM 21, and updates the DB operation information 39.

In step 612, the deployment destination site determination function 17 calculates the operation rate of each of the DBs, on the basis of the DB operation information 39. A calculation expression is as follows.

Operation Rate=Query Arrival Number÷Query Execution Number

In the determination 613, in a case where the CPU usage rate 395 is higher than the CPU usage rate threshold value 377 and the operation rate calculated in step 612 is higher than the operation rate threshold value 378, the deployment destination site determination function 17 proceeds to step 615. Otherwise, the deployment destination site determination function 17 proceeds to determination 614. Note that, the determination may be performed only by the CPU usage rate.

In the determination 614, in a case where the NW usage rate 396 is higher than the NW usage rate threshold value 379, the deployment destination site determination function 17 proceeds to step 615. Otherwise, the deployment destination site determination function 17 ends the processing.

In step 615, the deployment destination site determination function 17 instructs the deployment function 18 to start the cloud bursting. The deployment function 18 performs the deployment, on the basis of the preparation pattern determined in step 606, and the SDS preparation state 506 and the DB preparation state 507 of the subsite advance preparation information 40.

As described above, according to this system, in a case where the RTO is less than the build-out time of the system that is a bursting destination when performing the cloud bursting, the deployment is performed in the plurality of sites, otherwise, the deployment is performed in one site. For example, in a case where the RTO of the system is less than a build-out time of an extending portion of the public cloud, the deployment is performed in two or more sites, otherwise, the deployment is performed in one site. The build-out time of the system includes a time for the data copy to the public cloud from the on-premise data center. In addition, in the time for the data copy, the capacity of the data, and a communication band that is the in-use band are considered. Then, in a case where the deployment is performed in the plurality of sites, it is determined up to which a system component is deployed, and up to which the preparation is performed in advance including the activation and the suspension, on the basis of the RTO.

That is, in a redundancy determination system extending a system on an on-premise data center (for example, the on-premise data center 2) to a public cloud (for example, the public cloud 3) by using a including a processor and a memory, the processor performs first processing of deploying the system in a plurality of sites included in the public cloud when a recovery time objective (RTO) of the system is less than a build-out time of the system that is calculated on the basis of an operational status of the system, and second processing of deploying the system to one of the sites included in the public cloud when the recovery time objective of the system is not less than the build-out time. Accordingly, the RTO can be satisfied, and cloud bursting can be performed without increasing an unnecessary cost.

The public cloud includes a software-defined storage (SDS) and a data base (DB), and the processor, for example, as illustrated in the item 501 of FIG. 12, calculates the build-out time of the system including each of items of deployment of the SDS, data copy to the public cloud from the on-premise data center, activation and suspension of the SDS, deployment of the DB, and activation and suspension of the DB, and determines whether to perform the first processing or the second processing. Accordingly, the cloud bursting can be performed in consideration of a preparation time required for each of the items for building out the system.

In addition, the processor generates preparation patterns in which each of the items is combined, on the basis of the operational status of the system at a time point when performing the first processing or the second processing, and calculates the build-out time of the system for each of the generated preparation patterns. Accordingly, each of the items can be calculated with respect to each of the preparation patterns, in consideration of the operational status of the system at a time point when performing the cloud bursting, and the preparation time can be calculated for each of the preparation patterns.

The processor determines the operational status of the system, on the basis of capacity of the DB, and a communication traffic between the on-premise data center and the public cloud. Accordingly, in particular, the preparation time for each of the preparation patterns can be calculated in consideration of the database or the communication traffic.

The processor rearranges the build-out time of the system that is calculated for each of the preparation patterns in order of a cost to be presented. Accordingly, the user is capable of easily selecting a pattern having a high cost-effectiveness and of performing the cloud bursting.

What is claimed is:

1. A redundancy determination system extending a system on an on-premise data center to a public cloud by using a computer including a processor and a memory,
    wherein the processor performs first processing of deploying the system in a plurality of sites included in the public cloud when a recovery time objective of the system is less than a build-out time of the system that is calculated on the basis of an operational status of the system, and
    second processing of deploying the system in one site of the sites included in the public cloud when the recovery time objective of the system is not less than the build-out time.

2. The redundancy determination system according to claim 1,
    wherein the public cloud includes a software-defined storage (SDS) and a data base (DB), and
    the processor calculates the build-out time of the system including each of items of deployment of the SDS, data copy to the public cloud from the on-premise data center, activation and suspension of the SDS, deployment of the DB, and activation and suspension of the DB, and determines whether to perform the first processing or the second processing.

3. The redundancy determination system according to claim 2,
    wherein the processor generates preparation patterns in which each of the items are combined, on the basis of the operational status of the system at a time point when performing the first processing or the second processing, and calculates the build-out time of the system for each of the generated preparation patterns.

4. The redundancy determination system according to claim 3,
    wherein the processor determines the operational status of the system, on the basis of the capacity of the DB, and the communication traffic between the on-premise data center and the public cloud.

5. The redundancy determination system according to claim 3,
    wherein the processor rearranges the build-out time of the system that is calculated for each of the preparation patterns in order of a cost to be presented to a user.

6. A redundancy determination method performed in a redundancy determination system extending a system on an on-premise data center to a public cloud by using a computer including a processor and a memory, the method comprising:
    first processing of deploying the system in a plurality of sites included in the public cloud when a recovery time objective of the system is less than a build-out time of the system that is calculated on the basis of an operational status of the system; and
    second processing of deploying the system in one site of the sites included in the public cloud when the recovery time objective of the system is not less than the build-out time.

7. The redundancy determination method according to claim 6,
    wherein the build-out time of the system including each of items of deployment of an SDS, data copy to the public cloud from the on-premise data center, activation and suspension of the SDS included in the public cloud, deployment of a DB included in the public cloud, and activation and suspension of the DB is calculated, and whether to perform the first processing or the second processing is determined.

8. The redundancy determination method according to claim 7,
    wherein preparation patterns in which each of the items are combined are generated on the basis of the operational status of the system at a time point when performing the first processing or the second processing, and the build-out time of the system is calculated for each of the generated preparation patterns.

9. The redundancy determination method according to claim 8,
    wherein the operational status of the system is determined on the basis of capacity of the DB, and communication traffic between the on-premise data center and the public cloud.

10. The redundancy determination method according to claim 8,
    wherein the build-out time of the system that is calculated for each of the preparation patterns is rearranged in order of a cost to be presented to a user.

* * * * *